July 3, 1928. Re. 17,022
W. G. WILSON
RECIPROCATING VALVE
Original Filed July 16, 1925
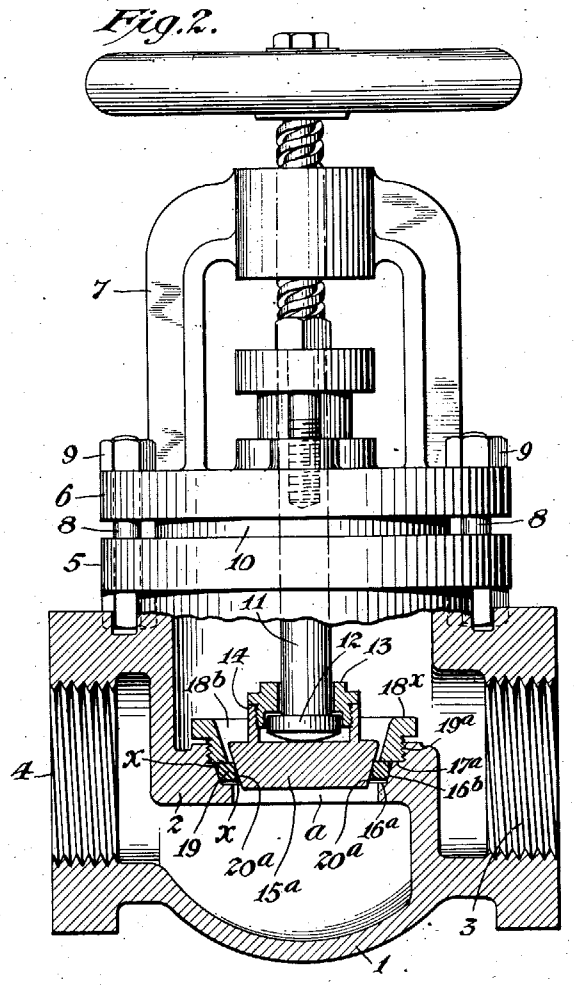
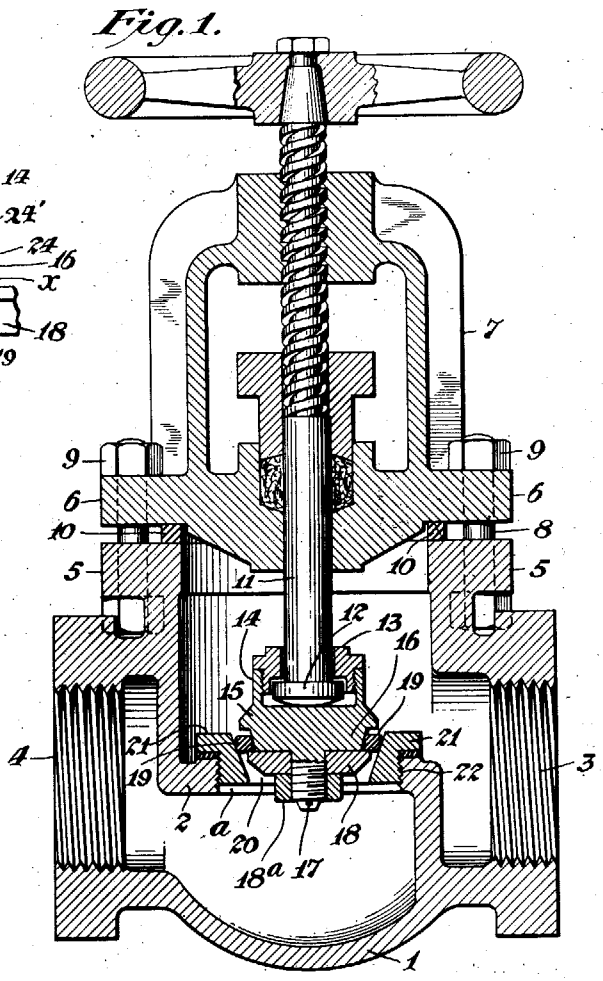
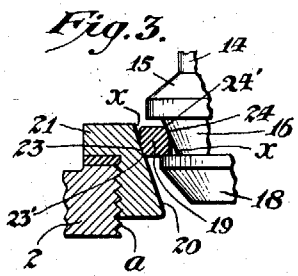
Wylie G. Wilson Inventor
By his Attorney
Frank J. Kent Reissued July 3, 1928. Re. 17,022

UNITED STATES PATENT OFFICE.

WYLIE GEMMEL WILSON, OF ELIZABETH, NEW JERSEY.

RECIPROCATING VALVE.

Original No. 1,616,672, dated February 8, 1927, Serial No. 43,906, filed July 16, 1925. Application for reissue filed August 23, 1927. Serial No. 214,939.

This invention relates to reciprocating valves. Its object is to produce a reciprocating valve having a fluid tight, port joint in which the complementary, sealing or joint forming surfaces do not necessarily require the usual grinding or machining operations either when first made or subsequently repaired; and which comprises a demountable, floatingly installed metal sealing ring having port sealing surfaces, one on the inner circumferential wall of the sealing ring and the other on its peripheral wall. Reciprocating valves including such a sealing ring, cooperative with and between opposable conical walled complementary sealing members, are intended for use where for one reason or another, the port sealing surfaces are required to be powerfully contacted for closure of the valve against flow of fluid through it.

In the accompanying drawings forming a part hereof and illustrating the invention—

Fig. 1 is a vertical, central section through a reciprocating valve embodying this invention in which the valve port is sealed by a sealing ring having interior and exterior sealing surfaces, the ring being carried by a movable member.

Fig. 2 is a view similar to Fig. 1, but in which the sealing ring is carried by a stationary member.

Fig. 3 is a sectional enlarged detail for better illustration of the interior and exterior sealing surfaces of the sealing ring in which the associated members are of the identical arrangement illustrated in Fig. 1.

In the form of the invention shown in Fig. 1, under casing member 1 has a diaphragm 2 formed with a threaded opening *a* between the intake and discharge chambers of the valve casing. Casing member 1 also has a port 3 and a port 4, one or the other of which forms an intake port and one or the other of which forms a discharge port. Casing member 1 has a flange 5 bolted to a flange 6 of an upper casing member 7 by bolts 8 and nut 9. A gasket 10 is interposed between the flanges, and the upper casing member is provided with the usual interior means for carrying a threaded valve stem 11. The under end of the stem is provided with a flanged enlargement 12 which is held in an inverted cupped nut 13 through the upper wall of which the stem passes freely, the nut being threaded into the upstanding, annular, threaded flange 14 of a sealing ring carrier 15.

The ring carrier 15 has a reduced under end portion the wall 16 of which tapers downwardly. The under end of the carrier 15 is provided with a threaded central extension 17 for reception of the washer 18 which is clamped in place by a nut 18[a]. The sealing ring is indicated by 19 and is carried by the reduced portion of the carrier having a downwardly tapering wall 16, the sealing ring being supported on the upper outward margin of the washer 18. The sealing ring is adapted for sealing contact with the downwardly tapering inner circumferential wall 20 of a threaded annulus 21. This annulus is threaded at 22 to the threaded wall of opening *a*. Carrier 15 moves the sealing ring into or out of contact with the downwardly and inwardly tapering circular wall 20 of annulus 21 when the stem is moved up or down.

In the construction of Fig. 1 and as better illustrated in Fig. 3, the sealing ring 19 has its under peripheral end portion 23 tapered downwardly and inwardly relatively to the upper portion of its peripheral wall. The upper, inner circumferential end portion of the ring is tapered upwardly and outwardly at 24. Below the tapered wall 23, the interior circumferential wall of the ring is parallel with the upper peripheral wall portion of the ring above the tapering surface 23.

These surfaces 23 and 24 constitute the sealing surfaces, important elements in which are the edges 23′ and 24′, both when the metal ring 19 characteristic of the invention, which is preferably non-circular in cross-section, is worn somewhat after use, and when said ring is originally placed in the valve. The ring is floatingly mounted on the downwardly and inwardly tapering circular portion 16 of carrier 15. When the valve stem is thrust downward under pressure, the ring is tightly wedged and somewhat expanded with its under peripheral sealing surface 23 in approximately hard contact with the downwardly and inwardly tapering wall 20 of the annulus 21, the wall 20 being the wall of the port which is to be closed by the sealing ring 19. When the edge 23′ of the sealing surface 23 has been contacted with the wall 20, the downwardly tapering portion 16 of the carrier, bears heavily on the upper corner or edge of the inner circumferential sealing surface 24 with the result that a ring distending strain is brought on the sealing surface 24 and edge 24′, more solidly compressing the seal surface 23 against the wall 20. Because the sealing ring 19 is floatingly mounted as shown, it better accommodates itself to any inequalities that there may be in the surface 20 or in the surface of the carrier portion 16.

In Fig. 2, the downwardly tapering cylindrical valve plug $15^a$ is carried by the stem. The under portion of the opening *a* through the diaphragm is provided with a circular shoulder $16^a$ above which the wall of opening *a* through the diaphragm is tapered upwardly and outwardly at $16^b$. The sealing ring 19 is of the identical construction of that already described and is mounted loosely with its under peripheral sealing surface against the wall $16^b$ forming a shoulder $17^a$ and being thereabove provided with a vertical threaded wall $19^a$. The shoulders $16^a$ and $17^a$ are horizontal and parallel. The sealing ring 19 is retained in place by an exteriorly threaded annulus $18^x$ having an upwardly and outwardly flaring inner circumferential wall $18^b$. In this construction, which is practically the reverse of that shown in Fig. 1, the tapered cylindrical wall with which the upper, inner circumferential sealing surface of the ring contacts, is the downwardly and inwardly tapering wall $20^a$ of the valve plug $15^a$.

In Fig. 1 the sealing ring is carried by the carrier 15 attached to the stem. In Fig. 2 the sealing ring is carried by the stationary diaphragm structure and the tapered circular wall is a part of the movable member $15^a$ attached to the stem. The parallel surfaces of the ring, one adjacent each edge portion forming a sealing surface 23 or 24, are spaced apart from the opposed tapered wall as at *x*. The sealing ring is preferably of metal.

The sealing ring should have as illustrated, a wall which is of small cross-section in order that substantial pressure on any part will deform it sufficiently to cause its contacting surface or surfaces to conform in contour to the contour of opposed surfaces. By small cross-section of the ring wall is meant a cross-section which is small both axially and cross-axially relatively to the exterior diameter of the ring. For example, a ring of two inches external diameter should have a thickness cross-axially of approximately one-fourth of an inch and a length axially of about one-fourth of an inch.

The seal forming surfaces are severally of hill and dale formation inevitably and this is especially the case when they are not ground.

I claim:

1. A valve including a plurality of valve sealing members, each of which has a tapered wall, one opposable to the other in a valve closing movement, in combination with a deformable and deformably mounted metal sealing ring having a peripheral margin and an inner circumferential margin both substantially cylindrical.

2. A valve including a plurality of valve sealing members, each of which has a tapered wall, one opposable to the other in a valve closing movement, in combination with a deformable and deformably mounted metal sealing ring having fairly sharp corner edges at its lower periphery and at its upper inner circumference.

3. A valve comprising complementary valve sealing members, each of which has a tapered wall, one opposable to the other in a valve closing movement, in combination with a floatingly mounted demountable metal sealing ring having perimetral fairly sharp edges adapted to be forced when the valve is closed bitingly against said opposable walls.

4. A valve comprising a plurality of structures, one of which is movable toward the other in a valve-closing movement, a metal sealing ring interposed between said structures, and means for compressing the sealing ring between said structures in the direction of said valve closing movement and simultaneously in directions radial to the ring, at different points around the ring, said means including, in combination, a male conical wall carried by one structure, a female conical wall carried by the other, said male wall telescoping within said female wall in valve-closing movement, the sealing ring being of such shape that the thickness of the ring parallel to the axis thereof is approximately as great as the cross-sectional distance through the ring measured between the sealing edges of the ring.

5. A valve comprising two relatively movable conical surfaces adapted to telescope in valve-closing movement, an angular sealing ring adapted to be engaged at diagonally opposite corners by the respective conical surfaces, and means for forcing the conical surfaces together to apply a distending strain to the ring.

In witness whereof I have hereto signed my name, this 10th day of August 1927.

WYLIE GEMMEL WILSON.